United States Patent [19]
Park et al.

[11] Patent Number: 6,093,344
[45] Date of Patent: Jul. 25, 2000

[54] POLYMER DISPERSED LIQUID CRYSTAL DISPLAY DEVICE

[75] Inventors: In Cheol Park, Seoul; Seung Hee Lee; Jae Geon You, both of Ich'on; Bong Gyu Rho, Suwon; Soon Ho Baek, Pusan, all of Rep. of Korea

[73] Assignee: Hyundai Electronics Industries Co., Ltd., Kyoungki-do, Rep. of Korea

[21] Appl. No.: 09/104,689

[22] Filed: Jun. 25, 1998

[30] Foreign Application Priority Data

Jun. 27, 1997 [KR] Rep. of Korea ............ 97-28471

[51] Int. Cl.[7] ............ C09K 19/52; C09K 19/12; C09K 19/20; G02F 1/1333
[52] U.S. Cl. ............ 252/299.01; 349/92; 428/1.1; 252/299.66; 252/299.67
[58] Field of Search ............ 252/299.01, 299.66, 252/299.67; 349/92; 428/1.1

[56] References Cited

U.S. PATENT DOCUMENTS

| | | | |
|---|---|---|---|
| 5,332,520 | 7/1994 | Bach et al. | 252/299.01 |
| 5,356,557 | 10/1994 | Jubb et al. | 252/299.01 |
| 5,498,365 | 3/1996 | Nolan et al. | 252/299.01 |
| 5,560,864 | 10/1996 | Goulding et al. | 252/299.01 |
| 5,698,134 | 12/1997 | Jubb et al. | 252/299.01 |
| 5,705,096 | 1/1998 | Kano et al. | 252/299.4 |
| 5,723,066 | 3/1998 | Coates et al. | 252/299.01 |
| 5,746,940 | 5/1998 | Coates et al. | 252/299.01 |
| 5,750,051 | 5/1998 | Goulding et al. | 252/299.65 |
| 5,762,823 | 6/1998 | Hikmet | 252/299.01 |
| 5,769,393 | 6/1998 | Kobayashi et al. | 252/299.01 |
| 5,830,385 | 11/1998 | Lau et al. | 252/299.01 |
| 5,863,457 | 1/1999 | Hasebe et al. | 252/299.01 |
| 5,871,665 | 2/1999 | Coates et al. | 252/299.01 |

*Primary Examiner*—C. H. Kelly
*Attorney, Agent, or Firm*—Selitto & Associates

[57] ABSTRACT

A polymer dispersed liquid crystal display device is disclosed. A polymer dispersed liquid crystal display device of the present invention includes a pair of substrates inside which electrodes are formed, respectively. The substrates are disposed to be opposite to each other and to be spaced to a cell gap. A liquid crystal polymer network and liquid crystal droplets which are phase separated from each other, are interposed between the substrates. The liquid crystal polymer network is perpendicularly arranged to the planes of the substrates regardless of presence or absence of electrical field. The liquid crystal droplets includes a plurality of liquid crystal molecules and are dispersed in the liquid crystal polymer network. The liquid crystal polymer network has a birefringe index which is similar to that of the liquid crystal. The liquid crystal polymer network is that a liquid crystal polymer having a higher glass transition temperature than an operation temperature of the liquid crystal is perpendicularly arranged to the planes of the substrate by a voltage of 1 to 100 V and hardened as it is. Preferably, the liquid crystal polymer network is that a liquid crystal monomer having UV hardening property is perpendicularly arranged to the planes of the substrates and harden as it is.

15 Claims, 3 Drawing Sheets

FIG. 3

| | Structure | n | R | Transition temperature(°C) |
|---|---|---|---|---|
| A | −[CH₂−CH]−x<br>　　　│<br>　COO−(CH₂)−n O−⟨⟩−⟨⟩−R | 2 | OCH₃ | G 120 N 152 I |
| | | 6 | OCH₃ | G 119 N 136 I |
| | | 6 | OC₅H₁₁ | G 80 N 129 I |
| | | 6 | OC₆H₁₃ | S 159 I |
| B | 　　　CH₃<br>　　　│<br>−[CH₂−C]−x<br>　　　│<br>　COO−(CH₂)−n O−⟨⟩−COO−⟨⟩−R | 2 | OCH₃ | G 101 N 121 I |
| | | 6 | OC₃H₇ | G 120 N 129 I |
| | | 6 | OCH₃ | G 95 N 105 I |
| | | 6 | OC₆H₁₃ | G 60 N 115 I |

POLYMER DISPERSED LIQUID CRYSTAL DISPLAY DEVICE

BACKGROUND OF THE INVENTION

1. Field of the Invention

The present invention is related to a polymer dispersed liquid crystal display device, and more particularly to a polymer dispersed liquid crystal display device where a liquid crystal is dispersed in a liquid crystal polymer medium.

2. Description of the Related Art

Generally, in the various liquid crystal (LCD) devices, those using twisted nematic (TN) mode have low operation voltage and low power consumption, and have been widely used in recent years. The TN mode cell has a liquid crystal layer interposed between first and second substrates on which transparent electrodes are formed. The optical axes of liquid crystal molecules are parallel to the planes of the substrates. The first and second substrates are arranged at a twist angle of almost 90°. However, since polarization system is used in the TN mode LCD device, there is a problem that the efficiency of light is low.

To solve the problem, a polymer dispersed liquid crystal display (PDLCD) device in which liquid crystal droplets are dispersed in a polymer medium, is proposed. In the PDLCD device, liquid crystal molecules are arranged randomly when a voltage is not applied to cell, and incident light is scattered by the difference in refraction indices between the liquid crystal and the polymer. As a result, a milky white state exists. On the other hand, when a voltage is applied to the cell, the liquid crystal molecules are arranged to be parallel to electric field, and incident light is transmitted because of no the difference in refraction indices between the liquid crystal and the polymer. As a result, a transparent state exists. Thus, since incident light is switched by light scattering without using the polarization system, there is a significant increase in the efficiency of light.

Eq. 1 shows refraction index n(a) of the liquid crystal at any view angle.

$$n(a) = n_e n_o / (n_e^2 \cos^2 a + n_o^2 \sin^2 a)^{1/2} \qquad \text{Eq. 1}$$

wherein a is a view angle, $n_e$ is an index of refraction for extraordinary light, and $n_o$ is an index of refraction for ordinary light.

As shown in Eq. 1, the liquid crystal has birefringence index $\Delta n$ where the refractive index varies with view angle, while the polymer does not have it. Therefore, refraction index makes a difference in the interface between the polymer medium and liquid crystal droplet, so that incident light is scattered at the interface between the polymer medium and liquid crystal droplet at even a transparent state. As a result, transmittance decreases at right and left view angle. Furthermore, the durableness of the device deteriorates by weak bonding strength of the polymer medium durableness of device.

SUMMARY OF THE INVENTION

It is therefore an object of the present invention to provide a polymer dispersed liquid crystal display device having a high transmittance regardless of view angle.

To accomplish this above object, a polymer dispersed liquid crystal display device of the present invention includes a pair of substrates inside which electrodes are formed, respectively. The substrates are disposed to be opposite to each other and to be spaced to a cell gap. A liquid crystal polymer network and liquid crystal droplets which are phase-separated from each other, are interposed between the substrates. The liquid crystal polymer network is perpendicularly arranged to the planes of the substrates regardless of presence or absence of electrical field. The liquid crystal droplets includes a plurality of liquid crystal molecules and are dispersed in the liquid crystal polymer network. The liquid crystal polymer network has a birefringence index which is similar to that of the liquid crystal.

In this embodiment, the each the difference in indices of refraction for ordinary light extraordinary light $n_o$ and $n_{po}$, indexes of refraction for extraordinary light $n_e$ and $n_{pe}$, and birefriengence indices $\Delta n$ and $\Delta np$ of the liquid crystal polymer network and the liquid crystal, is the range of −0.1 to 0.1. Preferably, the liquid crystal polymer network is that a liquid crystal polymer having a higher glass transition temperature than an operation temperature of the liquid crystal is perpendicularly arranged to the planes of the substrate by a voltage of 1 to 100 V and hardened as it is. Preferably, the liquid crystal polymer network is that a liquid crystal monomer having UV hardening property is perpendicularly arranged to the planes of the substrates and harden as it is. Furthermore, the weight percentage of the liquid crystal polymer network is 1 to 70%.

Additional object, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

FIG. 3 shows the structures of a liquid crystal polymer having a higher glass transition temperature than operation temperature of liquid crystal or more.

DETAILED DESCRIPTION OF THE INVENTION

Hereinafter, a preferred embodiment of the present invention will be explained in more detail with reference to accompanying drawings.

Figure 1:
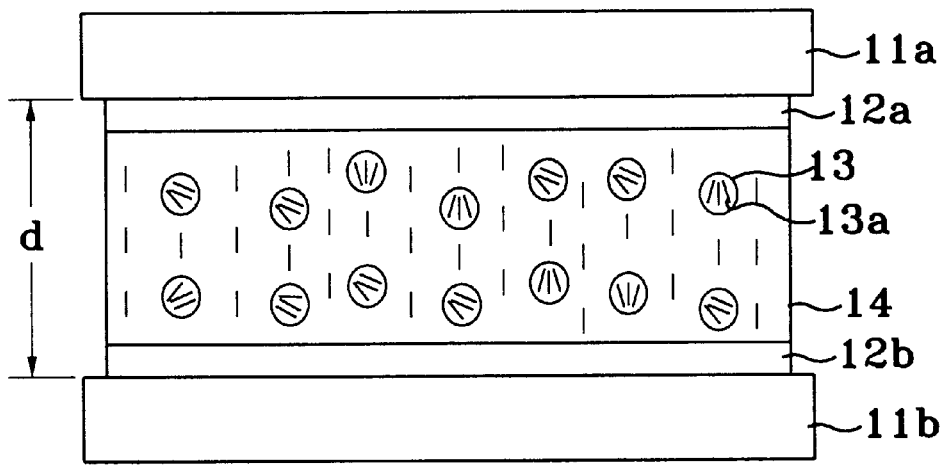
FIG. 1 shows a cross sectional view of a polymer dispersed liquid crystal display device according to an embodiment of the present invention when a voltage is not applied.
Figure 2:
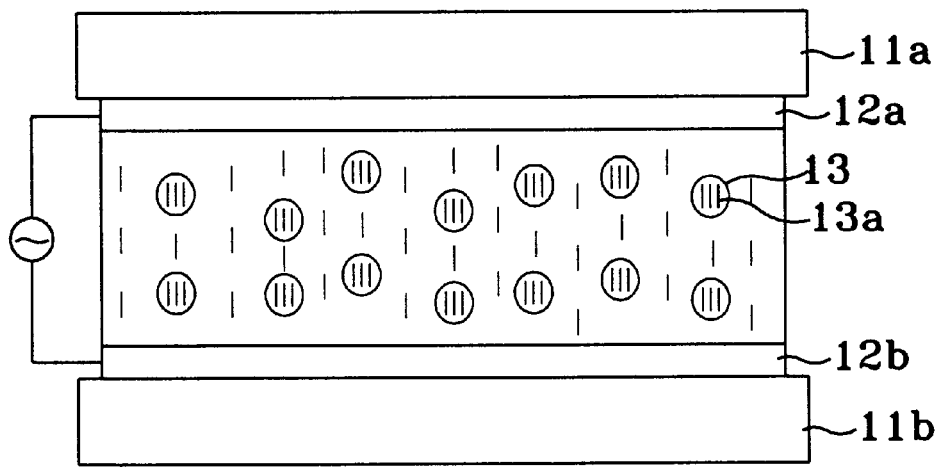
FIG. 2 shows a cross sectional view the liquid crystal display device of FIG. 1 when a voltage is applied.
Figure 4A:
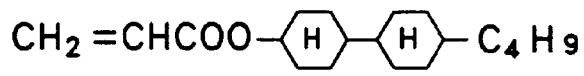
FIG. 4A to FIG. 4D show the structure of a liquid crystal polymer having UV hardening property.
Figure 4A:
Figure 4B:
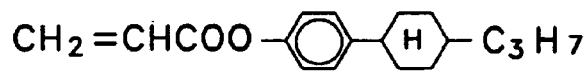
Figure 4B:
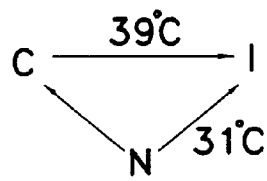
Figure 4C:
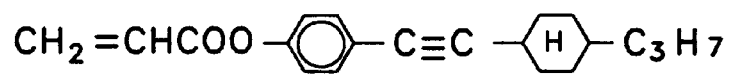
Figure 4C:
Figure 4D:
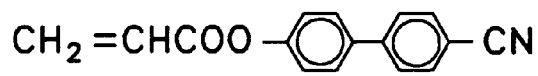
Figure 4D:
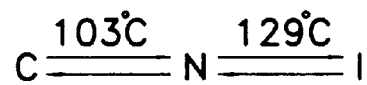

FIG. 1 and FIG. 2 show a PDLCD device according to an embodiment of the present invention wherein FIG. 1 shows the PDLCD when a voltage is not applied and FIG. 2 shows the PDLCD when a voltage is applied.

In FIG. 1, a first substrate 11a is disposed opposite a second substrate 11b. A cell gap d between the first and second substrates 11a and 11b is 1 to 100 μm. First and second electrodes 12a and 12b are formed inside of the first and second substrates 11a and 11b, respectively. Here, the first and second substrates 11a and 11b are made of a transparent insulating material such as a glass, and the first and second electrodes 12a and 12b are made of a transparent conductive material such as an indium thin oxide (ITO). A liquid crystal polymer network 14 in which liquid crystal droplets 13 including a plurality of liquid crystal molecules is dispersed, is interposed between the first and second substrates 11a and 11b on which the first and second electrodes 12a and 12b. Preferably, the weight percentage (wt %) of the liquid crystal polymer is 1 to 70%. Here, the liquid crystal is nematic liquid crystal. The liquid crystal polymer network 14 is perpendicularly arranged to the plates of the substrates 11a and 11b regardless of presence or absence of electric field. The liquid crystal polymer network 14 has a birefringence index $\Delta n_p$ which is similar to that of the liquid crystal. Preferably, each the difference in indices of refraction for ordinary light $n_o$ and $n_{po}$, indices of refraction for extraordinary light $n_e$ and $n_{pe}$, and birefriengence indices $\Delta n$ and $\Delta n_p$ of the liquid crystal and liquid crystal polymer network 14, is the range of −0.1 to 0.1.

The liquid crystal polymer network 14 is that a liquid crystal polymer having a higher glass transition temperature than operation temperature of the liquid crystal, preferably 60° C. or more, is hardened. The liquid crystal polymer network 14 has a structure as shown in FIG. 3. In FIG. 3, x and n are integer, and R is an material substituted with n value. G is glass state, N is nematic state, S is sematic state, and I is isotropic state. For example, in the structure A of FIG. 3, in case n value is 2, $OCH_3$ is substituted at R radical. At this time, the glass transition temperature 120° C. The liquid crystal polymer network 14 is that a liquid crystal monomer having an UV hardening property is hardened by UV and transformed into a liquid crystal polymer. The liquid crystal monomer has the structure as shown in FIG. 4A to FIG. 4D. In FIG. 4A to FIG. 4D, C is a crystal state, N is a nematic state, and I is an isotropic state.

The operation of the above PDLCD device will be explained. As shown in FIG. 1, when a voltage is not applied to the first and second electrodes 12a and 12b, the liquid crystal molecules 13a are arranged randomly, and incident light is scattered by the difference in refractive indices between the liquid crystal and the liquid crystal polymer network 14. As a result, a milky white state exists. On the other hand, as shown in FIG. 2, when a voltage is applied to the first and second electrodes 12a and 12b, between the first and second electrodes 12a and 12b, electric field is formed to be perpendicular to the planes of the 11a and 11b, and the optical axes of the liquid crystal molecules 13a are parallel arranged to the electric field. As a result, the liquid crystal molecules 13a are perpendicularly arranged to the planes of the substrate 11a and 11b the same as the liquid crystal polymer network 14. Therefore, incident light is transmitted because of no the difference in refraction indices between the liquid crystal and the polymer, so that a transparent state exists. At this time, birefringence indices between the liquid crystal polymer 14 and the liquid crystal is similar, thereby preventing light scattering at the interface between the liquid crystal polymer 14 and the liquid crystal droplets 13. Accordingly, transmittance is improved at right and left view angle.

Moreover, in the above PDLCD device, analyzer and polarizer (not shown) can be applied outside of the first and second substrates 11a and 11b. The analyzer and the polarizer are arranged so that they are orthogonal to each other. In this case, when a voltage is not applied to the first and second electrodes 12a and 12b, incident light becomes polarized linearly, and incident light passes through the analyzer due to a random arrangement of the liquid crystal molecules 13. As a result, a bright state exists. On the other hand, when a voltage is applied to the first and second electrodes 12a and 12b, incident light becomes polarized linearly at the polarizer to reach the analyzer due to the homoegeneous arrangement of the liquid crystal molecules 13a, and a dark state exists because the incident light is not good agreement with the polarization axis of the analyzer through which the light must exist.

Two methods of fabricating the above PDLCD device will be explained.

Firstly, a first fabricating method of the PDLCD using a liquid crystal polymer having a high transition temperature will be explained with reference to FIG. 1. First and second substrates 11a and 11b are provided. Inside of the first and second substrates 11a and 11b are formed first and second electrodes 12a and 12b, respectively. The first substrate 11a is disposed opposite the second substrate 11b so that they are spaced to a cell gap d of 1 to 100 µm. Here, the first and second substrates 11a and 11b are made of a transparent insulating material such as a glass. The first and second electrodes 12a and 12b are made of a transparent conductive material such as an ITO. Thereafter, the surrounding the first and second substrates 11a and 11b is sealed to form a vacant panel (not shown). A premixture in which a liquid crystal polymer and liquid crystal are mixed, is provided. The liquid crystal polymer has a higher glass transition temperature than operation temperature of the liquid crystal, preferably, 60° C. or more. The weight percentage (wt %) of the liquid crystal polymer of the premixture is 1 to 70%. Here, the liquid crystal polymer has a birefringence index $\Delta n_p$ which is similar to that of the liquid crystal. Preferably, each the difference in indices of refraction for ordinary light $n_o$ and $n_{po}$, indices of refraction for extraordinary light $n_e$ and $n_{pe}$, and birefrigence indices $\Delta n$ and $\Delta n_p$ of the liquid crystal and liquid crystal polymer network 14, is the range of −0.1 to 0.1. The liquid crystal polymer has the structures as shown in FIG. 3. The premixture is heated at temperature of the glass transition, preferably 60° C., or more thereby melting the liquid crystal polymer. For example, in the structure A of FIG. 3, in case n value is 2, the heating is performed at 120° C. or more. The melted premixture is injected into the vacant panel.

Thereafter, a voltage of 1 to 100 V is applied to the first and second electrodes 12a and 12b. Therefore, electric field is formed to be perpendicular to the planes of the substrates 11a and 11b, the liquid crystal molecules and liquid crystal polymer of the premixture are parallel arranged to electric field. At this state, the liquid crystal polymer of the premixture is hardened by rapid cooling or slow cooling, so that a liquid crystal polymer network 14 and liquid crystal droplets 13, which are phase-separated from each other, are formed.

Next, a second fabricating method of a PDLCD device using a liquid crystal monomer having UV hardening property will be explained with reference to FIG. 1. First and second substrates 11a and 11b are provided. First and second electrodes 12a and 12b are formed inside of the first and second substrates 11a and 11b. The first substrate 11a is disposed opposite the second substrate 11b so that they are spaced to a cell gap d of 1 to 100 µm. Here, the first and second substrates 11a and 11b are made of a transparent insulating material such as a glass. The first and second electrodes 12a and 12b are made of a transparent conductive material such as an ITO. Thereafter, the surrounding the first and second substrates 11a and 11b is sealed to form a vacant panel (not shown). A premixture in which a liquid crystal monomer having a UV hardening property and a liquid crystal are mixed, is provided. The weight percentage (wt %) of the liquid crystal monomer of the premixture is 1 to 70%. Here, the liquid crystal monomer has a birefringence index Δnp which is similar to the liquid crystal. Preferably, each the difference in indices of refraction for ordinary light $n_o$ and $n_{po}$, indices of refraction for extraordinary light $n_e$ and $n_{pe}$, and birefringence indices $\Delta n$ and $\Delta n_p$ of the liquid crystal and liquid crystal polymer network 14, is the range of −0.1 to 0.1.

Thereafter, a voltage of 1 to 100 V is applied to the first and second electrodes 12a and 12b. Therefore, electric field is formed to be perpendicular to the planes of the substrates 11a and 11b, so that the liquid crystal molecules and liquid crystal monomer of the premixture are parallel arranged to electric field. In this state, the premixture is irradiated by UV, so that the liquid crystal monomer is hardened. As a result, a liquid crystal polymer network 14 and liquid crystal droplets 13, which are phase-separated from each other. Preferably, UV irradiation is carried out at temperature of nematic state or more.

According to the present invention, the liquid crystal polymer network and the liquid crystal droplets which are phase separated form each other, are interposed between a pair of substrates being opposite to each other. The liquid crystal polymer has the birefringence index which is similar to that of the liquid. It is also arranged to be perpendicular to the planes of the substrates, regardless of the presence or absence of electric field. Therefore, in the presence of electric field, the liquid crystal and the liquid crystal polymer are parallel arranged to the electric field, and incident light is transmitted by no difference in refractive indices therebetween. At this time, undesirable scattering at the interface between the liquid crystal droplets and the liquid crystal polymer, is prevented. As a result, transmittance is improved at left and right view angle, thereby improving display characteristics of the PDLCD.

Although the preferred embodiment of this invention has been disclosed for illustrative purpose, those skilled in the art will appreciate that various modifications, additions and substitutions are possible, without from the scope and spirit of the invention as described in the accompanying claims.

What is claimed is:

1. A polymer dispersed liquid crystal display device comprising:

a pair of substrates inside which electrodes are formed, the substrates being disposed to be opposite to each other and to be spaced to define a cell gap;

a liquid crystal polymer network interposed between the substrates, the liquid crystal polymer network being perpendicularly arranged to the planes of the substrates regardless of the presence or absence of an electrical field; and liquid crystal droplets dispersed in the liquid crystal polymer network and including a plurality of liquid crystal molecules, wherein the liquid crystal polymer network has a birefringence index which is similar to that of the liquid crystal droplets.

2. The polymer dispersed liquid crystal display device according to claim 1, wherein the birefringence index $\Delta n$ of the liquid crystal droplets is defined as the difference between the refraction index $n_e$ of extraordinary light in the liquid crystal droplets and the refraction index $n_o$ of ordinary light in the liquid crystal droplets; wherein the birefringence index $\Delta n_p$ of the liquid crystal polymer network is defined as the difference between the refraction index $n_{pe}$ of extraordinary light in the liquid crystal polymer network and the refraction index $n_{po}$ of ordinary light in the liquid crystal polymer network; and wherein the difference between the birefringence index $\Delta n$ of the liquid crystal droplets and the birefringence index $\Delta n_p$ of the liquid crystal polymer network is in the range of −0.1 to 0.1.

3. The polymer dispersed liquid crystal display device according to claim 1, wherein the liquid crystal polymer network has a glass transition temperature higher than the operation temperature of the liquid crystal droplets.

4. The polymer dispersed liquid crystal display device according to claim 3, wherein the liquid crystal polymer network has the glass transition temperature of 60° C. or more.

5. The polymer dispersed liquid crystal display device according to claim 4, wherein the liquid crystal polymer network has the following structure:

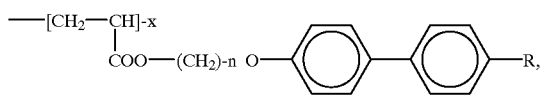

wherein x and n are integers greater than zero, and R is one material selected from the group consisting of $OCH_3$, $OC_5H_{11}$, and $OC_6H_{13}$.

6. The polymer dispersed liquid crystal display device according to claim 5, wherein the liquid crystal polymer network is one material selected from the group consisting of

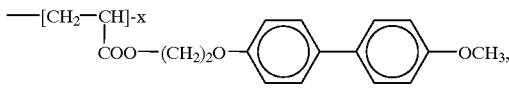

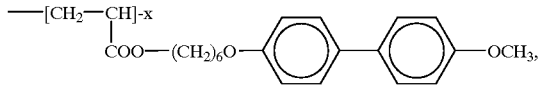

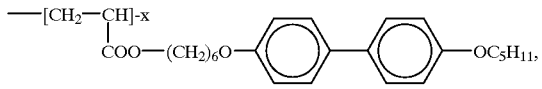

and

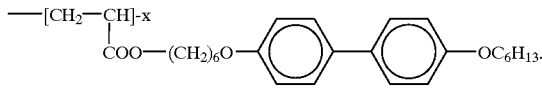

7. The polymer dispersed liquid crystal display device according to claim 4, wherein the liquid crystal polymer network has the following structure:

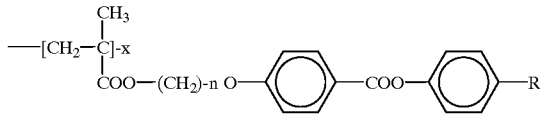

wherein x and n are integers greater than zero, and R is one material selected from the group consisting of $OCH_3$, $OC_3H_7$, and $OC_6H_{13}$.

8. The polymer network dispersed liquid crystal display device according to claim 7, wherein the liquid crystal polymer is one material selected from the group consisting of

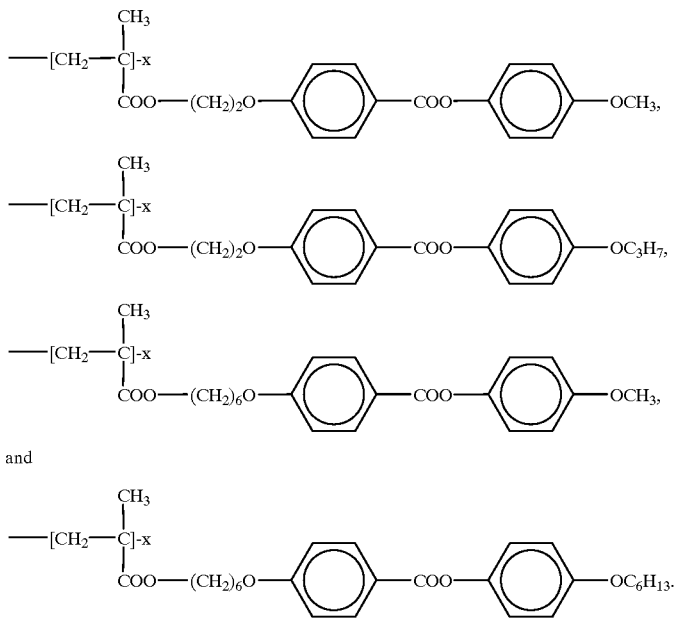

9. The polymer dispersed liquid crystal display device according to claim 1, wherein the liquid crystal polymer network is made from a liquid crystal monomer having a UV hardening property.

10. The polymer dispersed liquid crystal display device according to claim 9, wherein the liquid crystal monomer is one material selected from the group consisting of

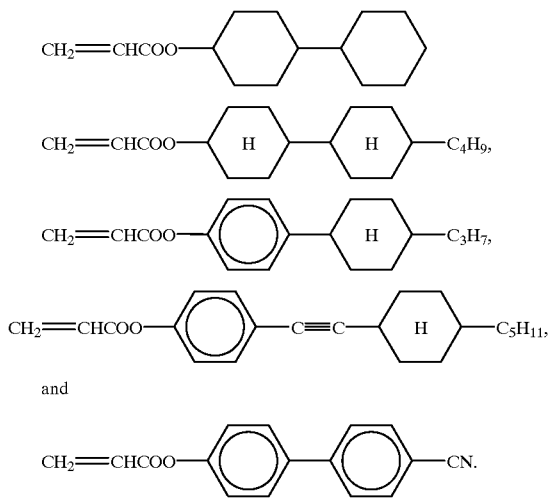

11. The polymer dispersed liquid crystal display device according to claim 1, wherein the weight percentage of the liquid crystal polymer network is 1 to 70%.

12. The polymer dispersed liquid crystal display device according to claim 1, wherein the cell gap is 1 to 100 μm.

13. The polymer dispersed liquid crystal display device according to claim 1, further comprising polarization plates disposed outside the substrates.

14. The polymer dispersed liquid crystal display device according to claim 13, wherein the polarization plates are orthogonal to each other.

15. The polymer dispersed liquid crystal display device according to claim 1, wherein the liquid crystal molecules of the liquid crystal droplets have optical axes which are arranged substantially perpendicular to the planes of the substrates and hence substantially parallel to the liquid crystal polymer network when a voltage is applied to the electrodes, the liquid crystal droplets and the liquid crystal polymer network cooperating so as to reduce the light scattering effect at the interface between the liquid crystal droplets and the liquid crystal polymer network when the optical axes of the liquid crystal molecules are arranged substantially parallel to the liquid crystal polymer network.

* * * * *